United States Patent
Engel et al.

(10) Patent No.: US 9,865,394 B2
(45) Date of Patent: Jan. 9, 2018

(54) ELECTRICAL COMPONENT COMPRISING A CONNECTION ELEMENT HAVING A PLASTIC BODY

(71) Applicant: EPCOS AG, München (DE)

(72) Inventors: Günter Engel, Leibnitz (AT); Michael Schossmann, Deutschlandsberg (AT); Markus Koini, Seiersberg (AT); Jürgen Konrad, Graz (AT); Stefan Obermair, Stainz (AT)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 14/415,548

(22) PCT Filed: Jun. 19, 2013

(86) PCT No.: PCT/EP2013/062780
§ 371 (c)(1),
(2) Date: Jan. 16, 2015

(87) PCT Pub. No.: WO2014/012732
PCT Pub. Date: Jan. 23, 2014

(65) Prior Publication Data
US 2015/0194264 A1   Jul. 9, 2015

(30) Foreign Application Priority Data

Jul. 17, 2012   (DE) .................. 10 2012 106 425

(51) Int. Cl.
*H01G 4/228*   (2006.01)
*H01G 4/30*    (2006.01)
(Continued)

(52) U.S. Cl.
CPC ............... *H01G 4/228* (2013.01); *H01G 2/02* (2013.01); *H01G 4/005* (2013.01);
(Continued)

(58) Field of Classification Search
CPC ...... H01G 4/228; H01G 4/005; H01G 4/1209; H01G 4/2325; H01G 4/30; H01G 4/1218; H01G 2/02
See application file for complete search history.

(56) References Cited

U.S. PATENT DOCUMENTS 4,151,579 A   4/1979   Stark
4,158,218 A   6/1979   McLaurin et al.
(Continued)

FOREIGN PATENT DOCUMENTS

CN   1930683 A       3/2007
DE   102006054085 A1   12/2007
(Continued)

OTHER PUBLICATIONS

Miller, G., "Trends bei Leistungshalbleitern (Trends in Power Semiconductor Technology)," elektroniknet.de, Nov. 25, 2011, www.elektroniknet.de/bauelemente/technik-know-how/leistungshalbleiter/article/84079/0/, 13 pages. (partial translation).

*Primary Examiner* — David M Sinclair
(74) *Attorney, Agent, or Firm* — Slater Matsil, LLP

(57) ABSTRACT

An electrical component is disclosed. In an embodiment the component includes a component body and at least one connection element having a plastic body, wherein the at least one connection element is connected to the component body via a metal layer.

13 Claims, 4 Drawing Sheets

(51) Int. Cl.
*H01G 4/232* (2006.01)
*H01G 4/005* (2006.01)
*H01G 2/02* (2006.01)
*H01G 4/12* (2006.01)

(52) U.S. Cl.
CPC ......... *H01G 4/1209* (2013.01); *H01G 4/2325* (2013.01); *H01G 4/30* (2013.01); *H01G 4/1218* (2013.01)

(56) References Cited

U.S. PATENT DOCUMENTS

| | | | |
|---|---|---|---|
| 4,740,657 A * | 4/1988 | Tsukagoshi | H01B 1/22 174/84 R |
| 5,348,574 A * | 9/1994 | Tokas | C23C 18/30 106/1.05 |
| 5,879,965 A * | 3/1999 | Jiang | H01L 21/4821 257/E23.053 |
| 7,558,047 B2 * | 7/2009 | Ukuma | H01G 4/2325 361/305 |
| 8,081,485 B2 | 12/2011 | Wischnat | |
| 8,389,307 B2 * | 3/2013 | Liu | H01L 33/486 257/100 |
| 2001/0051397 A1 * | 12/2001 | Jiang | H01L 21/4821 438/125 |
| 2005/0151233 A1 * | 7/2005 | Deepak | C22C 11/08 257/677 |
| 2006/0022173 A1 | 2/2006 | Yamakawa et al. | |
| 2009/0207555 A1 * | 8/2009 | Hackenberger | C04B 35/493 361/321.5 |
| 2011/0090665 A1 | 4/2011 | Korony et al. | |
| 2011/0304016 A1 | 12/2011 | Nakamura et al. | |
| 2012/0281335 A1 * | 11/2012 | Engel | H01G 4/258 361/274.1 |
| 2013/0107419 A1 * | 5/2013 | Hill | H01G 4/008 361/305 |
| 2013/0146347 A1 * | 6/2013 | McConnell | H01G 4/30 174/260 |

FOREIGN PATENT DOCUMENTS

| | | | | |
|---|---|---|---|---|
| DE | 602004006951 T2 | | 2/2008 | |
| EP | 1780813 A1 | | 5/2007 | |
| GB | 2337854 A | | 12/1999 | |
| JP | 61101063 A | * | 5/1986 | |
| JP | 62226636 A | | 10/1987 | |
| JP | 20003829 A | | 1/2000 | |
| JP | 2000223354 A | | 8/2000 | |
| JP | 2004183027 A | | 7/2004 | |
| JP | 2011204795 A | | 10/2011 | |
| JP | 2011258772 A | | 12/2011 | |
| JP | 2012033659 A | | 2/2012 | |
| JP | 2012099827 A | | 5/2012 | |
| WO | WO 2011085932 A1 | * | 7/2011 | ............. H01G 4/258 |

* cited by examiner

ELECTRICAL COMPONENT COMPRISING A CONNECTION ELEMENT HAVING A PLASTIC BODY

This patent application is a national phase filing under section 371 of PCT/EP2013/062780, filed Jun. 19, 2013, which claims the priority of German patent application 10 2012 106 425.3, filed Jul. 17, 2012, each of which is incorporated herein by reference in its entirety.

TECHNICAL FIELD

The invention relates to a component, in particular a capacitive component, having a substantially ceramic component body.

BACKGROUND

Capacitive components can be used in a versatile manner, for example, in the field of power semiconductors. Semiconductors, such as an IGBT (insulated-gate bipolar transistor) or a MOSFET (metal-oxide-semiconductor field-effect transistor), need to be wired to external capacitive components in order to meet high current and voltage requirements. In order to obtain a high efficiency of these switches, it is necessary for the external capacitive components to be connected to the semiconductor switches with the lowest possible inductance; in other words, it is necessary for the external capacitive components to have a small self-inductance and to be connectable close to the semiconductors. In addition, high temperatures occur, which on the one hand are desirable, since high temperatures at the active semiconductor zones of the component increase efficiency, but on the other hand complicate the connection technique. A key requirement of the component is thus a high capacitance density and good insulation capability at high temperatures. Film capacitors and aluminum electrolyte capacitors are eliminated under these conditions due to the technology-induced temperature limitation thereof. However, known capacitors based on barium titanate also have not been able to meet these requirements beforehand. The reason lies firstly in the requirement of external contacting resistant to high-temperature change and secondly in the unfavorable material properties of the increasingly poorer insulation at higher temperatures.

The external contacting of a ceramic capacitor component should perform a number of tasks: firstly, the connection should have sufficient mechanical stability to connect the component fixedly to the rest of the electronic circuit arrangement (for example, to a DCB substrate (direct copper bonded board substrate)). At the same time, such a connection is exposed to mechanical stresses, which may be induced by electrostrictive forces during operation and temperature changes. Temperature change can be induced by the surrounding environment or can be produced by natural heating of the component as current flows through during the semiconductor switching processes. A further temperature increase can be produced within the scope of production by soldering or sintering processes, which indeed occurs only once, but, in terms of the temperature reached, is greater than the maximum permissible working temperature.

Metals with good electrical conductivity, for example, copper or silver, are well suited for ensuring the electrical requirements and the temperature stability, however the different coefficients of expansion of ceramic and metal mean that mechanical stresses at the transition of ceramic component body and external contacting negatively influence the service life of such connections. Previous design compromises use, for example, metals with lower coefficients of expansion, however these are accompanied by poorer electrical conductivity. A further possibility provides stress relief by using suitable geometries (for example, in meander form), which go against the optimization of the inductance however and also require a certain outlay in terms of the production. Furthermore, the problem of the temperature resistance of the connection during operation remains. This can be avoided in the case of a soldered connection with high-temperature solder containing lead, which is increasingly a topic of controversy due to the material (RoHs) and reliability.

SUMMARY OF THE INVENTION

Embodiments of the invention provide a component having improved external contacting, which in particular is insensitive to temperature changes.

The basic concept is to decouple from one another the mechanical and electrical requirements on the external contacting in order to utilize the respective advantages of the materials, which are directed either to the electrical or the mechanical coupling of component body and connection element, and, by the combination of said materials, to obtain reliable contacting, which on the one hand withstands the thermal loads and the associated stresses in the contact region and also meets the electrical requirements (low inductance and high current-carrying capability due to low series resistance).

The mechanical requirements are met substantially by the plastic body of the connection element, which, due to the flexibility thereof, is insensitive to the thermal and therefore accompanying mechanical loads. The metal layer, which is provided between the plastic body and the component body, is optimized in terms of the electrical properties thereof. It comprises or consists of silver, for example, or other metals having good electrical properties, in particular good conductivity.

In a first embodiment, the plastic body, which substantially makes up the form of the connection element, is formed as an angle, that is to say it has a first part, which is arranged adjacently to the component body, and a second part, which extends at an angle to the first part. The first part enables reliable contact with the component body over a large area. The second part serves for contact with the component and can be connected, for example, to a substrate. If the angle between the first and the second part of the plastic body is substantially 90°, the component can be positioned in a stable manner, since the component can be fitted securely on the second part and can be mounted in this position. The angle is determined between the points of intersection of the directions in which the cross section of the first and second part extend.

In one embodiment the plastic body has a metallization on at least regions of the outer side thereof, that is to say on the exterior thereof. This metallization is a thin, conductive layer, of which the thickness is smaller than that of the metal layer connecting the component body and the connection element. The thickness is, for example, 75 to 150 μm, preferably 100 to 125 μm. Such a metallization may comprise copper or may consist of copper, for example. A thin silver layer is advantageously applied to such a copper layer (thickness 75 to 150 μm, preferably 100 to 125 μm), the thickness of which silver layer is 2 to 6 μm, preferably 3 to 5 μm. This metallization advantageously runs toward and/or underneath the metal layer, such that the component body can be electrically contacted via the metal layer and along the plastic body. It is, of course, also conceivable for the entire plastic body to be metallized, which is accompanied by simplified production and good current conductivity. The metallization on the plastic body allows the feed of current and voltage along the plastic body to the metal layer, and via the metal layer to the component body.

In one embodiment a connection surface is provided on the second part of the plastic body and is electrically conductively connected to the metal layer. This connection surface can be applied, for example, as a sintered layer on the metallization. This connection surface can be connected, for example, by soldering to a circuit board or a substrate during the assembly of the component. In one embodiment the sintered layer is applied to a nickel gold palladium layer, wherein the nickel gold palladium layer may also coat the entire plastic body. The nickel gold palladium layer with good electrical properties can be applied by thin-film technology.

In one embodiment, the plastic body comprises a material from the group polyester ether ketone (PEEK) or polyimide, which have good mechanical properties. The material for the plastic body is temperature-resistant and flexible so as to absorb and withstand the mechanical loads during operation.

In one embodiment, the metal layer comprises sintered silver. Sintering is a method for producing materials. Here, fine-grained ceramic or metal materials are heated to temperatures below the melting points thereof, usually at increased pressure. A metal layer of this type can be sintered at temperatures of approximately 250° C. or below. Said metal layer is heat-resistant and does not melt subsequently during soldering or during operation. Alternatively, other materials can also be applied by a sintering process. The connection surface can be made of the same material during the same production step as the metal layer. The connection between the sintering layer on the connection element and the component body can be produced by soldering.

In one embodiment, the metal layer has a strip-shaped, elongate geometry with a width-to-thickness ratio greater than 6, in particular greater than 30. The form and size may correspond substantially to the side of the component body to be contacted. This planar geometry of the conductive path has a particularly advantageous effect on the inductive behavior of the component in the case of contact.

In one embodiment, the metal layer is arranged between a sputtered layer or baked-on layer on the component body and the metallization on the plastic body. The sputtered or baked-on layer is connected to inner electrodes in the interior of the component body. Such a component body is advantageously a capacitor body with ceramic dielectric layers and inner electrodes. The dielectric layers may comprise, for example, an anti-ferroelectric perovskite. The use of this material, for example, with copper inner electrodes solves the problem of high leakage currents in barium titanate ($BaTiO_3$) based systems at high temperatures, as are usual in power electronics.

In one embodiment, the component body is cuboidal with two angled connection elements on opposite sides of the component body. This is a compact and yet stable arrangement. This embodiment allows a low overall height, which, together with the good resistance of the ceramic and the reliable connection of the connection elements, even at high temperatures, also benefits from the integratability of the component in a semiconductor module.

BRIEF DESCRIPTION OF THE DRAWINGS

The invention will be explained hereinafter with reference to the drawings on the basis of exemplary embodiments.

In the drawings.

DETAILED DESCRIPTION OF ILLUSTRATIVE EMBODIMENTS

Figure 1:
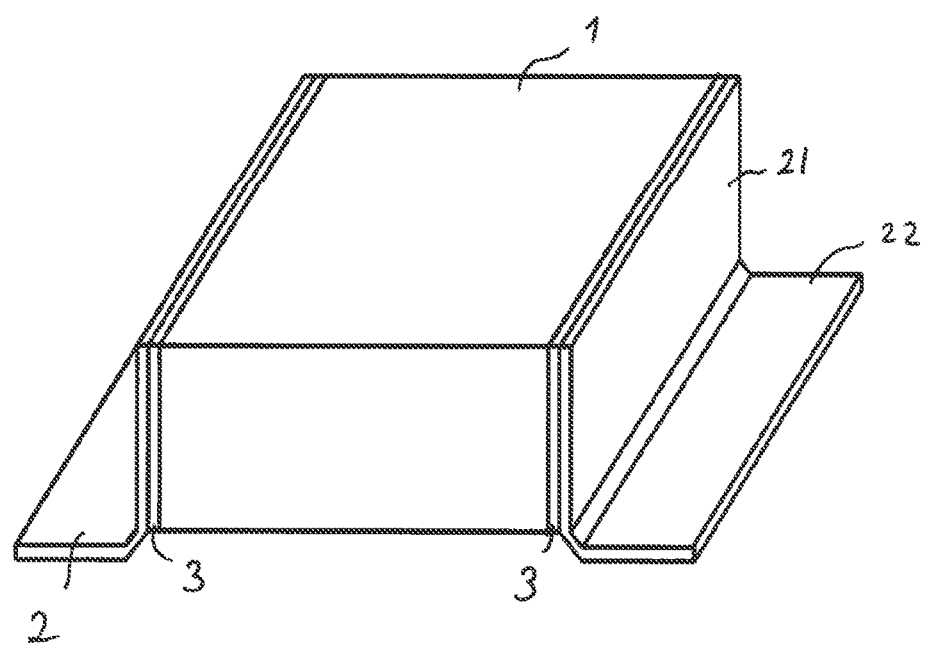
FIG. 1 shows an exemplary embodiment of a capacitive component.

FIG. 1 shows a capacitive component having a cuboidal ceramic component body 1. The dimensions may be 7×7×2.5 mm, for example, or, alternatively, 7.5×7.5×3.5 mm. The ceramic used may be, for example, an anti-ferroelectric lead lanthanum zirconium titanate (PLZT) ceramic.

Connection elements 2 are provided on opposite sides of the component body 1 and are formed at angles with a first and a second part 21, 22. The connection elements 2 each have a plastic body 23, of which the form corresponds to the form of the connection elements 2. The connection elements 2 hold the component body 1 and allow the operating voltages and currents to be applied to the component. The first parts 21 are arranged adjacently to side faces of the component body 1 and are connected to these side faces via a metal layer 3. The second parts 22 extend substantially at right angles to the first parts 21 and allow the component to be contacted, for example, by SMD contacting. The dimensions of the connection element 2 are oriented to those of the component body 1. Based on the above examples, the width is 7 to 7.5 mm. The height is 2.5 to 3.5 mm.

Figure 2:
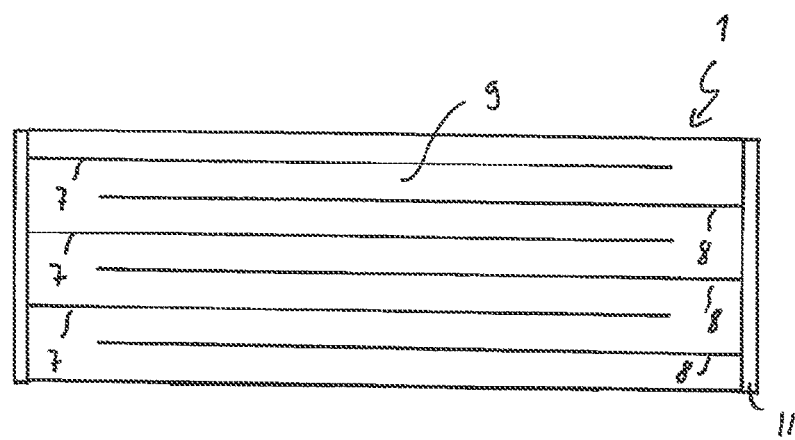
FIG. 2 shows a cross section through an exemplary embodiment of a component body of the component.

FIG. 2 shows a cross section through an exemplary embodiment of the component body 1 of the component.

The component body 1 is constructed in a multi-layer design and may be sputtered, for example. It comprises ceramic dielectric layers 9, between which first and second inner electrodes 7, 8, for example, made of copper, are arranged alternately. The stack direction runs in the direction of the height of the component body 1. The first inner electrodes 7 extend as far as an outer side and are electrically connected there by a sputtered or baked-on layer 11, which serves as a connection surface. The second inner electrodes 8 extend as far as the opposite outer side and are electrically connected there by a sputtered or baked-on layer 11, which serves as a connection surface. The component body 1 can be constructed monolithically or can consist of a plurality of cascaded individual ceramics. A voltage is applied between the connection surfaces during operation and is fed via the connection elements 2.

Figure 3:
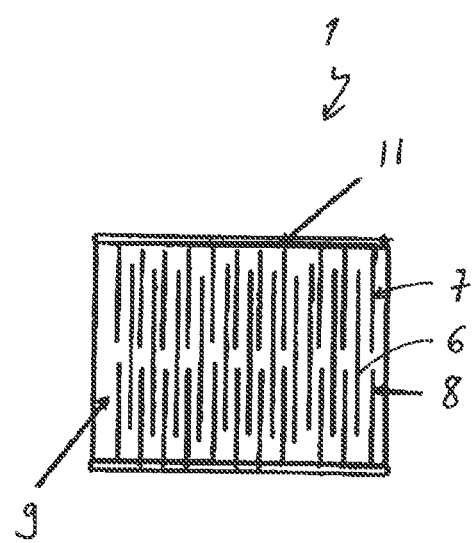
FIG. 3 shows a cross section through a further exemplary embodiment of the component body of the component.

FIG. 3 shows a cross section through a further exemplary embodiment of the component body 1 of the component.

The component body 1 differs from the previous exemplary embodiment in terms of the inner electrode arrangement. First inner electrodes 7 extend as far as an outer side and are electrically connected there by a sputtered or baked-on layer 11, which serves as a connection surface. Second inner electrodes 8 extend as far as the opposite outer side and are electrically connected there by a sputtered or baked-on layer 11, which serves as connection surface. Adjacent first and second inner electrodes are arranged at a distance from one another in the same plane. Third 'buried' inner electrodes 6 are arranged between these planes and are not connected to the connection surfaces. An electric field or a current flow forms substantially in the stack direction. The design of this inner electrode arrangement corresponds to an inner series circuit.

Figure 4:
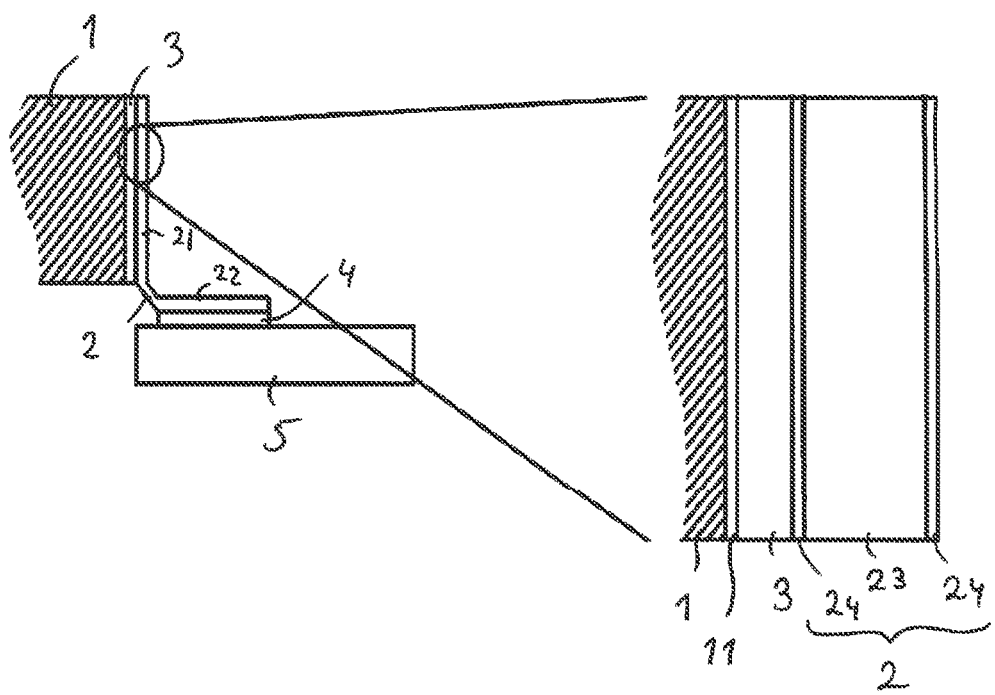
FIG. 4 shows a detailed view of the connection between the connection element and the component body of the component.

FIG. 4 shows a detailed view of the connection point between the ceramic component body 1 and the connection element 2.

The connection element 2 has a plastic body 23, which determines the form of the connection element 2. The material for the plastic body 23 is a heat-resistant flexible plastics material, or colloquially plastic, in particular a heat-resistant flexible polymer, and may comprise, for example, polyester ether ketone (PEEK) or polyimide. The plastic body 23 is so flexible that the mechanical loads during operation do not lead to material fracture.

The connection element 2 further has a metallization 24 applied to the plastic body 23, which metallization is made, for example, of copper and silver. This metallization 24 can be structured, for example, in the form of a conductive path, or may cover a (large) area, for example, in a manner running from the underside to the side of the plastic body 23 facing the component body 1, or may cover the entire exterior of the plastic body 23. The provision of the metallization 24 is optional in particular in regions on either side of the metal layer 3, for example, on the side of the connection element 2 facing away from the component body 1.

The metal layer 3 is provided between the metallization 24 and the baked-on or sputtered layer 11. This may be a sintered silver layer, for example. The silver layer may have been sintered either onto the component body 1 or the connection element 2 and then connection to other parts of the component, for example, by soldering. Alternatively, the connection may also be made by the sintering process. The silver layer has good current conductivity with low resistance. In addition, it is temperature-resistant and does not melt either during the soldering or with exposure to operation-induced temperature fluctuations.

The metal layer 3 has a current conductivity such that the contribution thereof to the overall electrical series resistance is smaller than that of the ceramic component body 1. It therefore has a cross section that is greater than the overall cross section of the inner electrodes, which is approximately 1 mm$^2$. The overall cross section of the inner electrodes is the cross-sectional area either of the first or second inner electrodes 7, 8 with a section parallel to the sputtered or baked-on layer 11. The metal layer 3 has a flat strip-shaped and elongate geometry, of which the ratio of width to thickness is greater than 6 and particularly advantageously greater than 30. The thickness is the extension of the metal layer 3 between metallization 24 and sputter layer 11. The width is determined along the longitudinal extension of the connection element 2, that is to say running into the drawings.

The contact or external termination of the component body 1 by the illustrated multi-layer connection combines mechanical strength and electric current-carrying capability by use of different materials, which are each directed to one of these aspects. The advantages of the materials with mechanical compliance, that is to say mechanical yield, and electrically favored properties are thus combined with one another.

The contact of the entire component 2 on a substrate 5, such as a DCB substrate or another power module substrate is established on the underside of the second part 22 of the connection element 2. A connection surface 4 provided for this purpose may be, for example, a nickel gold palladium layer applied by thin-film technology, to which a sintered silver layer can be applied on the underside of the second part 22. A connection surface 4 made of nickel gold palladium can also be soldered.

The contacting can be established, for example, by solder in an SMD mounting process.

Conceivable characteristics of a capacitive component include an optimal and maximum operating voltage Vop=380 V or VDCmax=560 V. The capacitance may be between 0.5 to 1 µF at the optimal operating voltage. The current is 3 A_rms at 200 kHz and a temperature rise of 40° C. The service life may be more than 100 000 hours at 105° C./Vop or more than 20 000 hours at 125° C./Vop.

It is noted that exemplary embodiments comprising other combinations of the described features are conceivable.

The invention claimed is:

1. A component comprising:
   a component body;
   at least one connection element having a plastic body, wherein the plastic body comprises polyester ether ketone, the plastic body comprising:
      a first part arranged adjacently to the component body; and
      a second part extending at an angle from the first part, wherein the angle between the first and the second part is substantially 90°;
   a metallization arranged at least in regions of an outer side on the first part and at least in regions of an outer side of the second part of the plastic body;
   a metal layer arranged on the first part and the metallization, wherein the metal layer comprises sintered silver and has a strip-shaped geometry with a width-to-thickness ratio greater than 6, wherein the metal layer is disposed between the metallization of the plastic body and a first layer that is one of a sputtered layer disposed on the component body or a baked-on layer disposed on the component body, wherein the metal layer is connected, by soldering, to the first layer, wherein the at least one connection element is connected to the component body via the metal layer, and wherein a form and a size of the metal layer corresponds substantially to a form and a size of a side of the component body to be contacted; and
   an electrically conductive connection surface arranged on the second part and the metallization, wherein the metal layer and the connection surface are separate and independent and electrically connected.

2. The component according to claim 1, wherein the connection surface comprises a nickel gold palladium coating.

3. The component according to claim 1, wherein the metal layer has the strip-shaped geometry with the width-to-thickness ratio greater than 30.

4. The component according to claim 1, wherein the component body comprises a capacitor body with a stack of ceramic dielectric layers and inner electrodes.

5. The component according to claim 4, wherein the ceramic dielectric layers comprise an anti-ferroelectric perovskite.

6. The component according to claim 1, wherein the component body is cuboidal with two angled connection elements on opposite sides of the component body.

7. A component comprising:
   a component body;
   at least one connection element having a plastic body, the plastic body comprising:
      a first part arranged adjacently to the component body; and a second part extending at an angle from the first part, wherein the angle between the first and the second part is substantially 90°;

a metallization arranged at least in regions of an outer side on the first part and at least in regions of an outer side on the second part of the plastic body;

a metal layer arranged on the first part and the metallization, wherein the metal layer consists essentially of sintered silver and has a strip-shaped geometry with a width-to-thickness ratio greater than 6, wherein the metal layer is disposed between the metallization of the plastic body and a first layer that is one of a sputtered layer disposed on the component body or a baked-on layer disposed on the component body, wherein the metal layer is connected, by soldering, to the first layer, wherein the at least one connection element is connected to the component body via the metal layer, and wherein a form and a size of the metal layer corresponds substantially to a side of the component body to be contacted; and an electrically conductive connection surface arranged on the second part and the metallization, wherein the metal layer and the connection surface are separate and independent and electrically connected.

8. The component according to claim 7, wherein the connection surface comprises a nickel gold palladium coating.

9. The component according to claim 7, wherein the plastic body comprises a material selected from the group consisting of polyester ether ketone and polyimide.

10. The component according to claim 7, wherein the metal layer has the strip-shaped geometry with the width-to-thickness ratio greater than 30.

11. The component according to claim 7, wherein the component body comprises a capacitor body with a stack of ceramic dielectric layers and inner electrodes.

12. The component according to claim 11, wherein the ceramic dielectric layers comprise an anti-ferroelectric perovskite.

13. The component according to claim 7, wherein the component body is cuboidal with two angled connection elements on opposite sides of the component body.

* * * * *